United States Patent [19]
Bramwell et al.

[11] 4,151,815
[45] May 1, 1979

[54] OPERATION TIMING CONTROL SYSTEM FOR AN INTERNAL COMBUSTION ENGINE

[75] Inventors: Christopher H. Bramwell; John M. Ironside, both of Birmingham; Duncan B. Hodgson, Leamington Spa, all of England

[73] Assignee: Lucas Industries Limited, Birmingham, United Kingdom

[21] Appl. No.: 804,309

[22] Filed: Jun. 7, 1977

[30] Foreign Application Priority Data
Jun. 16, 1976 [GB] United Kingdom ............... 24915/76

[51] Int. Cl.² ............................. F02B 5/02; F02P 5/04
[52] U.S. Cl. .......................... 123/32 EB; 123/32 EH; 123/117 D
[58] Field of Search ........ 123/32 EH, 32 EL, 32 EB, 123/32 EC, 32 EA, 117 R, 117 D, 148 E; 364/431

[56] References Cited
U.S. PATENT DOCUMENTS
4,036,190  7/1977  Bigliani et al. ................. 123/117 D

*Primary Examiner*—Charles J. Myhre
*Assistant Examiner*—Tony M. Argenbright

[57] ABSTRACT

An engine operation timing control includes a transducer producing pulses at predetermined different angular positions of the engine shaft, a speed counter connected to the transducer and periodically generating a multibit digital signal corresponding to the speed of the engine, a programmed read only memory device addressed by the speed counter providing a digital output identifying the transducer pulse appropriate to commence the operation at the existing speed, and counter means for periodically causing commencement of said operation in synchronism with respective ones of the transducer pulses, said memory device being connected to said counter means to vary the phase of said counter means relative to shaft position.

5 Claims, 5 Drawing Figures

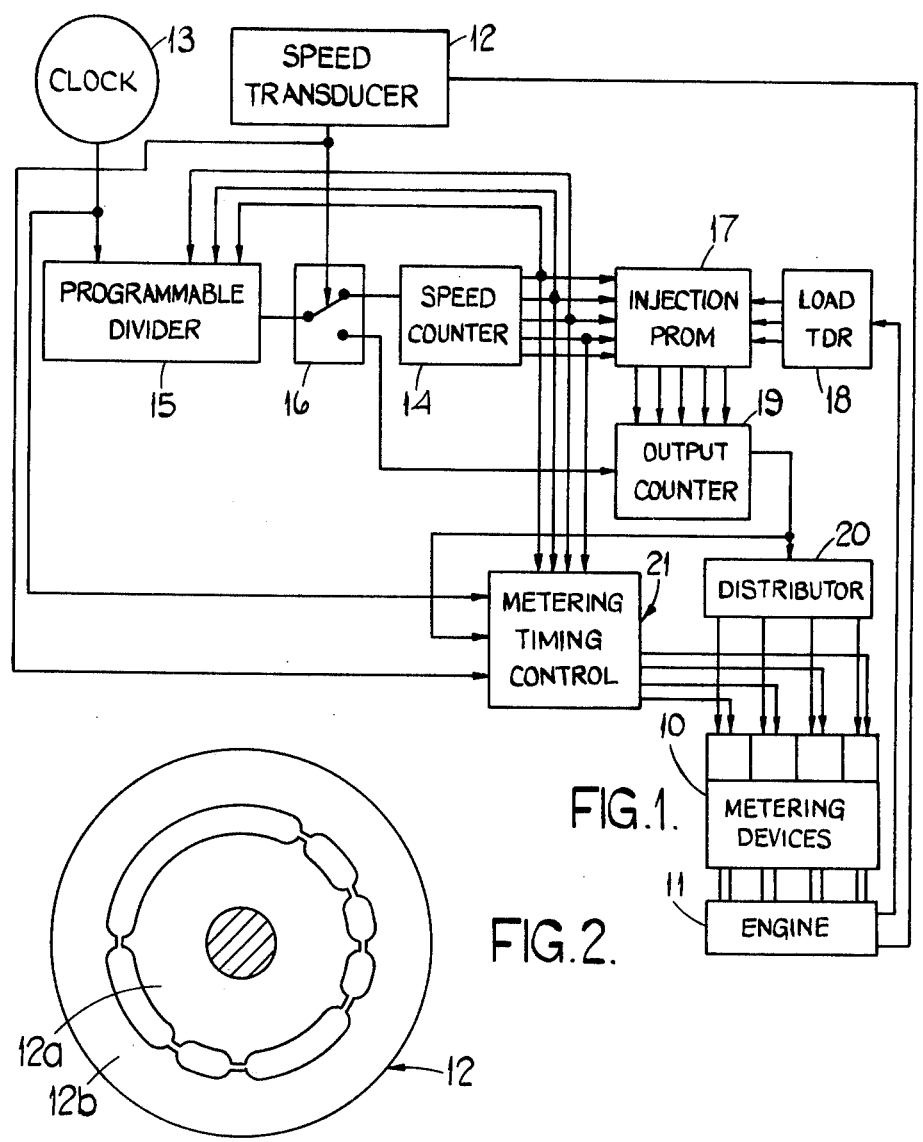
FIG.1.
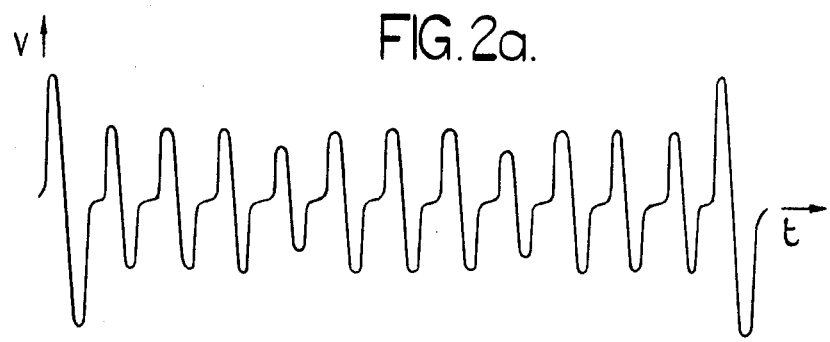
FIG.2.
FIG.2a.

OPERATION TIMING CONTROL SYSTEM FOR AN INTERNAL COMBUSTION ENGINE

This invention relates to operation timing control systems for internal combustion engines, particularly fuel injection control systems for diesel engines or ignition control systems for petrol engines.

It has already been proposed, in a control system for a diesel engine, to use a fuel metering device for measuring and holding under pressure a charge of fuel of volume dependent on engine operating conditions in combination with an electronic injection timing control for determining the exact instant at which the measured charge is released into the engine.

In such a system a finite time is required to enable the required charge of fuel to be prepared and it has been found desirable to ensure that the delay between preparing a charge and releasing should be kept reasonably short. The time required to prepare a charge varies with the volume to be injected, but in practice may be of the order of 28mS. Within the normal running speed range of a diesel engine the time taken for one revolution of the engine shaft will vary between say 40 and 400mS. Injection may be required to take place at an angle of up to 30° before or 10° after the top dead centre position for any cylinder of the engine. It will therefore be seen that the optimum timing of the commencement of the operation of the metering device will depend on many factors and could require a complex electronic control system.

Similarly, in a spark ignition system for a petrol engine, for efficient operation of the engine the spark should be produced at a specific instant in the engine cycle in dependence on the existing engine conditions, and both mechanical and electrical means are in use for achieving this. Also, in order that the spark shall be produced when required, current of the right magnitude must be flowing in the ignition coil primary, ready to be turned off at the appropriate instant. It is obviously wasteful of energy if such current is caused to be maintained unnecessarily in the coil primary waiting to be switched off. It will therefore be appreciated that the finite time necessary to build up the primary current presents similar problems in an electronic control system for a petrol engine, as does the time to prepare the fuel charge in a diesel system.

It is an object of the present invention to provide an operation timing control system for an internal combustion engine in a convenient form.

According to the invention there is provided an internal combustion engine electronic operation timing control circuit for determining the instant when an engine operation is to be commenced, said circuit including a transducer driven by the engine and producing pulses at predetermined different angular positions of the engine shaft, speed counter means connected to said transducer and periodically generating a digital signal corresponding to the speed of the engine, a programmed read only memory device addressed by said speed counter means and providing a digital output corresponding to the transducer pulse appropriate to commence said operation at the existing speed, and counter means for periodically causing commencement of said operation in synchronism with respective ones of the transducer pulses, said memory device being connected to said counter means to vary the phase of said counter means relative to the shaft position in accordance with the output of the memory device.

Preferably, means is provided for detecting acceleration of the engine and arranged to supply to said counter means pulses in addition to the transducer pulses when acceleration is detected whereby the phase shift is rapidly effected.

In the case of a particular diesel engine and petrol engine to which the invention is applied, it will be known by the engine designer, when the earliest point in the engine cycle will be that the fuel can be called upon to be injected or the spark to be produced respectively under all the prevailing conditions that the vehicle, in which the engine is installed, will meet. Knowing this angle in the engine cycle, it then becomes a matter of determining for each speed increment, the angle in the engine cycle necessary at that speed, to give the amount of time necessary for, for example, 28mS of fuel metering to take place, or the appropriate equivalent time for current build-up to occur, respectively. Knowing this angle in the engine cycle, and having a transducer which periodically produces pulses representing incremental angles in the engine cycle, it is therefore possible to programme a memory with information which represents the appropriate pulse from the transducer for the existing speed, which will allow the fuel or current to be produced, before the earliest time it will be called upon to be released.

It will be appreciated that the way in which the position in the engine cycle when fuel is injected or the spark is produced, is achieved, may take a variety of forms and such ways need not be appreciated in order that the present invention can be understood.

In the accompanying drawings

FIG. 1 is a block diagram of a diesel engine fuel injection system embodying an example of the invention;

FIG. 2 is a view of a transducer used in the system;

FIG. 2a is a graph showing the output waveform of the transducer;

Figure 3:
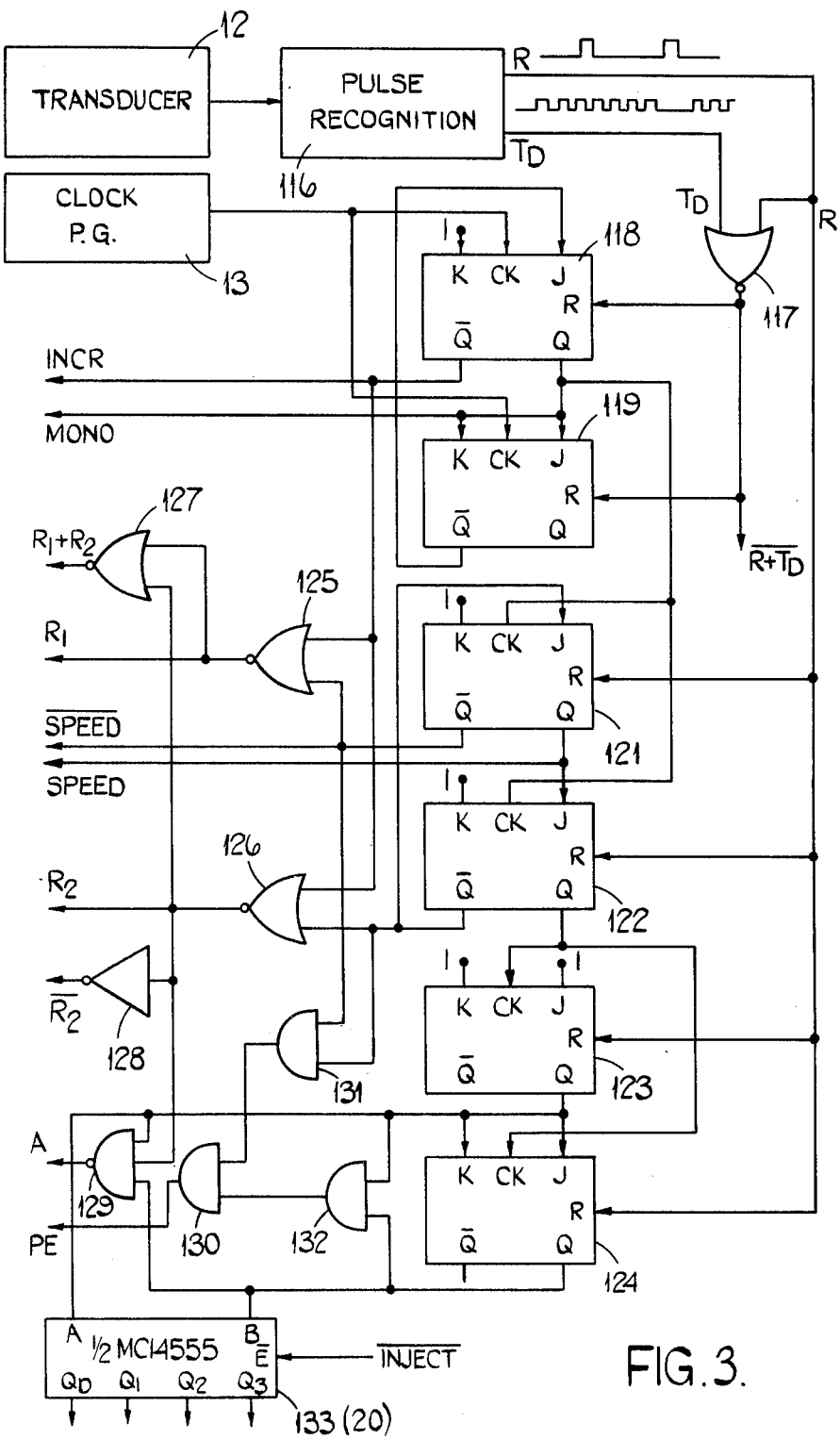
FIG. 3 is a diagram of a control logic circuit used in the system.

The system shown in FIG. 1 is based on the system described in Assignee's co-pending U.S. patent application Ser. No. 804,308 filed June 7, 1977 and is not fully described in all detail herein. For a full understanding of the overall system said U.S. Ser. No. 804,308 should be referred to.

Basically the system shown includes a bank of fuel metering devices 10, one for each cylinder of the engine. Each device has two terminals, one for receiving a signal to indicate that metering of fuel can commence and another for receiving an INJECT signal at a precisely timed instant in the engine operating cycle, so that fuel is then rapidly released into the associated cylinder of the engine 11.

The engine 11 drives a speed transducer 12 which produces a train of pulses at specific engine shaft positions. These pulses are used to obtain a digital speed signal, basically by counting the number of pulses from a clock 13 between two successive pulses from the transducer 12. To this end there is provided a speed counter 14 which has pulses from the clock 13 routed to it during the speed computation portion of the operating cycle via a programmable divider 15 and an electronic switch 16. The divider 15 is controlled in turn by the output of the counter 14, the three most significant bit outputs of the counter 14 being connected to the control terminals of the divider 15 so that the divisor increases as the count of the counter 14 increases and thereby reduces the rate at which the count increases. This has the effect of compressing the dynamic range of the speed computing system and allows (as is described in co-pending U.S. Ser. No. 804,308 efficient use to be made of the memory 17 of the system. The output terminals of the counter 14 are connected to one set of input terminals of an empirically programmed read-only memory device which also has inputs from a load transducer 18 associated with the engine. The output of the memory 17 is periodically read into an output counter 19 to which count-down pulses from the clock 13 are fed via the divider (with its divisor fixed in accordance with the values of the three most significant bits of the speed count at the end of the speed computing period) and the switch device 16 when determination of the instant of injection is commenced. The output counter 19 emits a pulse when its count reaches 'O' and this pulse is routed via a distributing network 20 to an appropriate one of the devices 10. This arrangement determines the injection timing.

The shaft position transducer 12 is generally as described in in Assignee's co-pending U.S. patent application Ser. No. 870,988, filed Jan. 20, 1978 and is electromagnetic. As shown in FIG. 2 the transducer has a stator 12b with poles at the 1, 2, 3, 4, 6, 7 and 9 o'clock positions but no poles at the 5, 8, 10, 11 and 12 o'clock positions and a rotor 12a with a similar pole arrangement. The transducer includes a permanent magnet and a pick-up coil and, as explained in more detail in the aforesaid U.S. Ser. No. 870,988 produces output pulses when the rotor 12a is rotated, each pulse having a positive going part and a negative going part. The heights of the pulses vary as shown in FIG. 2a, with one large pulse per revolution of the rotor and eleven much smaller pulses. In fact two of the eleven smaller pulses are slightly smaller than the remainder, but this is not significant. As shown in FIG. 3 the transducer 2 is followed by a pulse recognition circuit 116 arranged to distinguish between the single larger pulse and the remaining eleven pulses in the manner generally described in U.S. Ser. No. 870,988. The single pulse appears at a terminal R and the remaining eleven at a terminal $T_D$.

In the following description all the gates, flip-flops, etc., are Motorola CMOS Integrated circuits.

FIG. 3 mainly embodies devices for producing short, clock synchronous reset pulses at each transducer pulse, the transducer position counter and various gates for producing certain reset pulses only at a particular states of the transducer. The circuit shown is common to the injection timing system of the aforesaid U.S. Ser. No. 804,308.

The control logic of FIG. 3 includes a NOR gate 117 (¼ MC 14001) which has two inputs connected to the R and $T_D$ terminals respectively and so produces a logic output signal $\overline{R + T_D}$. The output of the NOR gate 117 is connected to the RESET terminals of two JK type flip-flops 118, 119 (each ½ MC 14027). The CLOCK terminals of these two flip-flops are connected to the clock pulse generator 13 operating at a high frequency e.g. about 250 KHz. The J input terminal of flip-flop 118 is connected to the $\overline{Q}$ output terminal of flip-flop 119 and the K input terminal of flip-flop 118 is connected to a fixed logic 1 input. The J and K input terminals of the flip-flop 119 are connected to the Q output terminal of the flip-flop 118 which is also connected to an output terminal labelled MONO. The $\overline{Q}$ output terminal of the flip-flop 118 is also connected to an INCR output terminal.

The flip-flops 118, 119 generate a train of output signals at the MONO output terminal, each output signal commencing at a positive-going edge of each R or $T_D$ signal and having a duration of 4 µS. The output signals at the INCR terminal are inverted with respect to the MONO signals.

A second pair of JK flip-flops 121, 122 (each ½ MC 14027) have their RESET terminals connected to the R rail and their CLOCK input terminals connected to the Q output terminal of flip-flop 118. The J input terminal of flip-flop 121 is connected to the $\overline{Q}$ output terminal of flip-flop 122 and the J input terminal of flip-flop 122 is connected to the Q output terminal of the flip-flop 121.

Effectively the flip-flops 121, 122 form a counter counting the three segments of each quadrant of the operating cycle. At the end of each cycle both flip-flops are reset by the R pulse and each successive MONO pulse clocks the flip-flops 121, 122.

The Q and $\overline{Q}$ output terminals of the flip-flop 121 are connected to SPEED and $\overline{SPEED}$ output terminals respectively and are used, as will be explained hereinafter, to control the speed measuring portion of the cycle.

A third pair of flip-flops 123, 124 (each ½ MC 14027) are used for counting the quadrants. Each has its RESET terminal connected to the R rail and its CLOCK terminal connected to the Q output terminal of the flip-flop 122. The J and K input terminals of the flip-flop 123 are connected to a logic 1 input and the J and K input terminals of the flip-flop 124 are both connected to the Q output terminal of the flip-flop 123.

The control logic circuit also includes an array of gates (which are all various Motorola CMOS gates of unspecified type) for producing, reset and other control pulses. Firstly, a NOR gate 125 has inputs from the $\overline{Q}$ output terminals of flip-flops 119 and 121. This produces an $R_1$ reset pulse immediately after the first, fourth, seventh and tenth $T_D$ pulses after each R pulse. A NOR gate 126 has inputs from the $\overline{Q}$ outputs of flip-flops 119 and 122. This produces an $R_2$ reset pulse immediately following the second, fifth, eighth and eleven $T_D$ pulses after each R pulse. An OR gate 127 with inputs from the NOR gates 125 and 126 produces a train of pulses $R_1 + R_2$. An inverter 128 provides a $\overline{R_2}$ output. A NAND gate 129 has input from the Q output terminals of the flip-flops 123 and 124 and a further input from the NOR gate 126. This produces an A pulse immediately following the second $T_D$ pulse after each R pulse. An AND gate 130 has input from two further AND gates 131 and 132. Gate 131 has inputs from the $\overline{Q}$ output terminals of the flip-flops 121 and 122 and the gate 132 has inputs from the Q output terminals of flip-flops 123 and 124. The gate 130 produces a PE output for the period between the third and fourth $T_D$ pulses after each R pulse. Only the R + $T_D$, INCR, MONO, $R_2$ A and PE outputs are used in the following circuit, the remainder being employed in a circuit described in the aforesaid co-pending U.S. Ser. No. 804,308 relating to the injection timing system.

Figure 4:
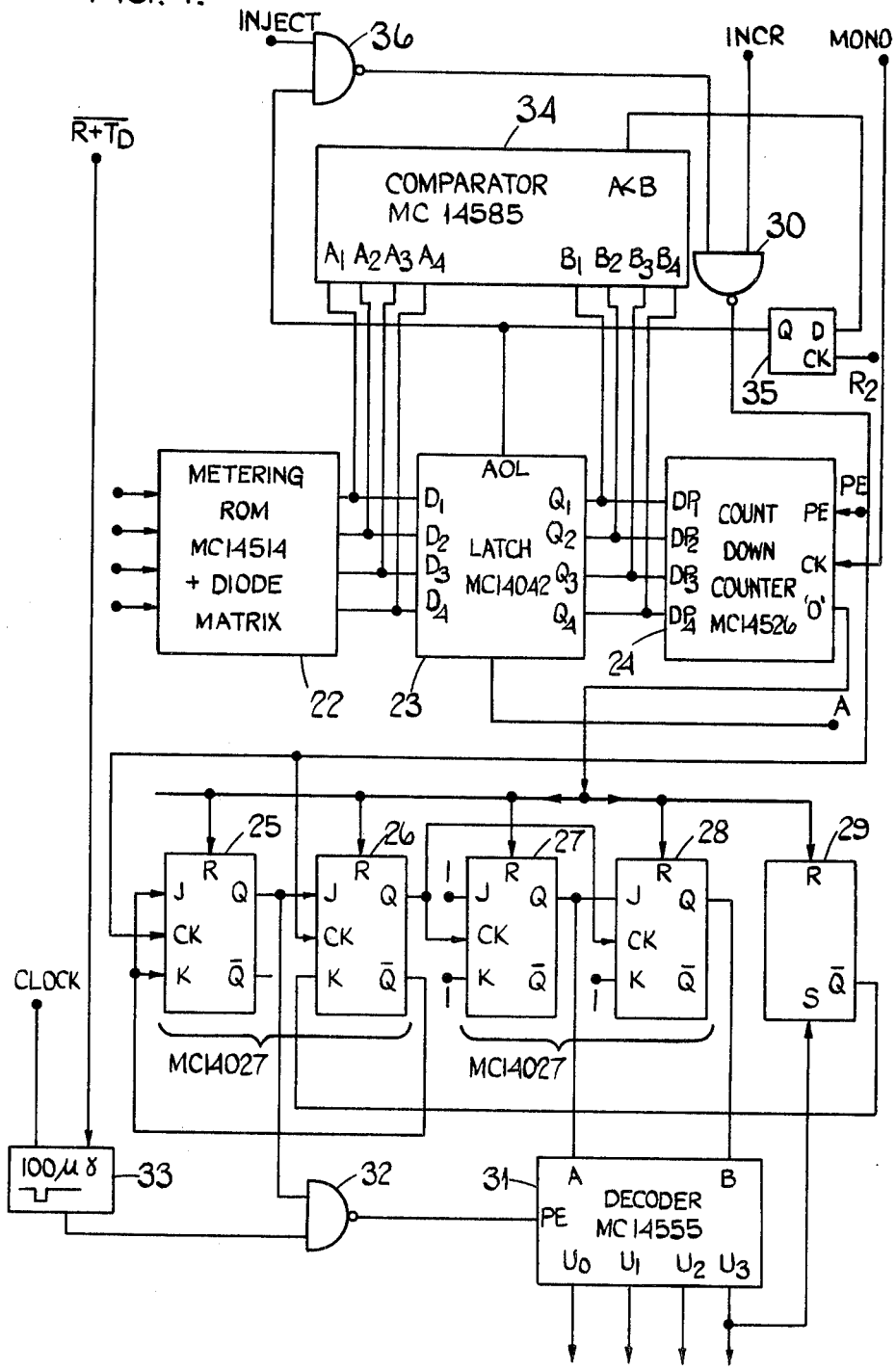
FIG. 4 is a block diagram of another part of the system.

Metering timing is achieved by a metering timing control 21 of FIG. 1 which is shown in more detail in FIG. 4.

A metering read-only memory 22 is addressed by the most significant four bits of the output of the speed counter 14. This memory 22 consists of an MC 14514 integrated circuit buffering an array of diodes arranged in sixteen lines of four diodes per line so as to give a specific four bit digital output for each four bit digit input in manner known per se. The actual diode connections are selected in accordance with the characteristics of the particular engine to be controlled and a full example is not given here, suffice it to say that the digital output of the memory 22 represents the desired phase difference between the transducer pulse train and the appearance of the signals at the output of the metering timing control 21 as will be hereinafter fully described.

The four output terminals of the memory 22 are connected to the four data input terminals $D_1$, $D_2$, $D_3$, $D_4$ of a four bit latch type MC 14042. The CLOCK terminal of the latch is connected to the A terminal of FIG. 3 so that the contents of the latch are up-dated after each speed-computing period of the main control system. The latch has a further input terminal AOL to which a pulse can be supplied whilst the latch is being held to up-date the latch at some different time in certain conditions as will be explained hereinafter. The data output terminals $Q_1$, $Q_2$, $Q_3$, $Q_4$ of the latch are connected to the data preset terinals $DP_1$, $DP_2$, $DP_3$, $DP_4$ of a counter 24 (type MC 14526) which has its CLOCK terminal connected to the MONO terminal (FIG. 3) so as to count down towards 0000. The PRESET ENABLE terminal of the counter 24 is connected to the PE terminal (FIG. 3).

The '0' output terminal of the counter 24 is connected to the RESET terminals of four JK type flip-flop circuits 24, 26, 27 and 28 and the RESET terminal of an RS type flip-flop circuit 29. The four JK flip-flop circuits 25 to 28 are arranged as a divide by twelve counter. The two flip-flop circuits 25, 26 have their CLOCK terminals connected to the output terminal of a NAND gate 30 and the J and K terminals of the circuit 25 are connected to the $\overline{Q}$ terminal of the circuit 26. The Q terminal of the circuit 25 is connected to the J terminal of the circuit 26 which has its K terminal connected to the $\overline{Q}$ terminal of circuit 29. The CLOCK terminals of the circuits 27 and 28 are connected to the Q output terminal of the circuit 26. The J and K terminals of the circuit 27 and the K terminal of the circuit 28 are all connected to a logic 1 supply and the Q terminal of the circuit 27 is connected to the J terminal of the circuit 28.

The signals appearing at the Q terminals of the circuits 27 and 28 represent a two-bit binary code and this code is decoded to a one-of-four code by a decoder 31 (type MC 14555) to which the Q terminals are connected. Outputs from the decoder 31 are enabled by a NAND gate 32 which has one input from the Q terminal of the circuit 25 and another from a 100 μS monostable circuit 33 driven by the trailing edges of pulses from the $\overline{T_D + R}$ terminal of FIG. 3.

The latch 23 is normally clocked four times in each cycle of twelve transducer pulses, but the counter 24 is only loaded once during each such cycle. At steady speed, therefore, the '0' output terminal of the counter 24 emits a single synchronising pulse per transducer revolution, synchronised with a specific one of the transducer pulses, the output of the memory will always be less than 1100. This pulse resets the circuits 25 to 28 which then start counting pulses from the gate 30, which, at steady speed, are just pulses from the transducer circuit 12. Whilst the Q terminals of circuits 27, 28 are both low, at the first occasion on which the Q terminal of circuit 25 is low following a transducer pulse, a 100 μS output pulse will appear at terminal $U_0$ of decoder 31. Similarly in the same conditions when the Q states of circuits 27, 28 are 01, a 100 μS pulse will appear at terminal $U_1$ of decoder 31 and so on. The circuits 25 to 29 will reset automatically at the end of the twelve pulse cycle before the '0' pulse arrives from the counter 24. If, during the preceding cycle, the speed has reduced to an extent such that the output of the memory 22 is increased by one or more, a resetting pulse will be produced by the counter 24 one or more transducer pulses after the circuits 25 to 28 have self-reset and these circuits will be reset again.

In the event of an increase in speed during the cycle, the counter 24 will be set to a lower preset value and the '0' output pulse will appear one or more pulses early. This may have the effect of causing one of the output pulses from the decoder 31 to be omitted and to avoid this possibility there is provided a comparator 34 (type MC 14585) with its two sets of data input terminals connected to the input and output terminals of the latch 23. The A < B output terminal, at which a pulse appears when the output of the memory 22 is less than the output of the latch 23, is connected to the D input terminal of a D type flip-flop circuit 35. The Q output terminal of circuit 35 is connected to the AOL terminal of the latch 23 and also to one terminal of a NAND gate 36 which has its other input terminal connected to an INJECT terminal (effectively the output terminal of the output counter 19). The output terminal of the gate 36 is connected to an input terminal of the gate 30. The CLOCK terminal of the circuit 35 is connected to the speed INCR terminal of counter control logic circuit so as to receive a short pulse at the end of the speed computing period and another such pulse after the next INJECT pulse has been received. Thus when there is an increase in speed an extra pulse is supplied to the circuits 25, 26 before the next transducer pulse to ensure that no count is missed. The latch is also up-dated prematurely.

The arrangement described has its memory 22 programmed so that for all speed conditions the time allowed for metering is adequate for each metering device. Rapid phase shift is achieved during acceleration but the relatively slower phase shift during deceleration is not harmful.

We claim:

1. An internal combustion engine operation timing control circuit for determining the instants when an engine operation is to be commenced, said circuit comprising the combination of an engine shaft position transducer producing pulses at predetermined different positions of the engine shaft, datum pulse means connected to the transducer and periodically producing a datum pulse indicating a datum position of the engine shaft, speed counter means connected to said transducer and periodically generating a digital signal corresponding to the existing speed of the engine, a programmed read only memory device connected to the speed counter means and providing a digital output which is a function of only the input thereto from the speed counter means, said digital output representing the number of transducer pulses desired to follow each datum pulse before one of said operations is to be commenced at the existing engine speed, further counter means connected to cause commencement of said engine operation in synchronism with selected ones of said transducer pulses, loading means periodically operating to load the output of the memory into the further counter means, and further means connected to said transducer and said datum pulse means for routing said datum pulse and succeeding transducer pulses to the further counter means, said further counter means causing commencement of said operation when the number of transducer pulses following each datum pulse is equal to the number loaded thereinto from the memory device, whereby the phase of commencement of said operations relative to the datum pulses is varied in accordance with the output of the memory, as a function of the existing engine speed.

2. A circuit as claimed in claim 1, further comprising means for detecting acceleration of the engine, arranged to supply to said counter means pulses in addition to the transducer pulses when acceleration is detected.

3. An internal combustion engine operation timing control circuit for determining the instants when an engine operation is to be commenced, said circuit comprising the combination of an engine shaft position transducer producing pulses at predetermined different positions of the engine shaft, datum pulse means connected to the transducer and periodically producing a datum pulse indicating a datum position of the engine shaft, speed counter means connected to said transducer and periodically generating a digital signal corresponding to the existing speed of the engine, a programmed read only memory device connected to the speed counter means and providing a digital output which is a function of only the input thereto from the speed counter means, said digital output representing the number of transducer pulses desired to follow each datum pulse before one of said operations is to be commenced at the existing engine speed, further counter means connected to cause commencement of said engine operation in synchronism with selected ones of said transducer pulses, loading means periodically operating to load the output of the memory into the further counter means, and further means connected to said transducer and said datum pulse means for routing said datum pulse and succeeding transducer pulses to the further counter means, said further counter means causing commencement of said operation when the number of transducer pulses following each datum pulse is equal to the number loaded thereinto from the memory device, whereby the phase of commencement of said operations relative to the datum pulses is varied in accordance with the output of the memory, i.e. as a function of the existing engine speed, means for detecting acceleration of the engine, arranged to supply to said counter means pulses in addition to the transducer pulses when acceleration is detected, a latch circuit interposed between the memory device and said counter means, said latch circuit being enabled at intervals, and means being provided for detecting a decrease in the input of the latch circuit during such intervals to produce said additional pulses.

4. An internal combustion engine timing control circuit for determining the instants when an engine operation is to be commenced, said circuit comprising the combination of an engine shaft position transducer producing pulses at each of a plurality of predetermined different positions of the engine shaft, datum pulse means connected to the transducer and periodically producing a datum pulse indicating a datum position of said shaft, speed counter means connected to said transducer and periodically producing a digital signal corresponding to the existing speed of the engine, a programmed read only memory device connected to the speed counter means and providing a digital output which is a function of only the input thereto from the speed counter, cyclically operating counter means for producing output pulses synchronized with selected ones of the transducer pulses, said cyclically operating counter means producing a plurality of such output pulses between successive datum pulses, a control counter connected to the transducer and the datum pulse means so as to count pulses from the transducer and biasing means connecting the output of the memory device to the control counter and operating periodically to bias the output of the memory device into the control counter said control counter being connected to the cylically operated counter means so as to set the latter to a predetermined state each time the number of transducer pulses received by the control counter following a datum pulse is equal to the memory output loaded thereinto, the output pulse of the cyclically operated counter means controlling commencement of said engine operations, and the phase relationship of such output pulses in relation to the datum pulses being varied in accordance with the output of the memory device, i.e. as a function of the existing engine speed.

5. An internal combustion engine timing control circuit for determining the timing of an engine operation comprising first and second timing controls, respectively, determining the instants of a preparatory engine operation and the instants of a definitive engine operation, said first timing control comprising the combination of an engine shaft position transducer producing pulses at predetermined different positions of the engine shaft, datum pulse means connected to the transducer and periodically producing a datum pulse indicating a datum position of the engine shaft, speed counter means connected to said transducer and periodically generating a digital signal corresponding to the existing speed of the engine, a programmed read only memory device connected to the speed counter means and providing a digital output which is a function of only the input thereto from the speed counter means, said digital output representing the number of transducer pulses desired to follow each datum pulse before one of said operations is to be commenced at the existing engine speed, further counter means connected to cause commencement of said engine operation in synchronism with selected ones of said transducer pulses, loading means periodically operating to load the output of the memory into the further counter means, and further means connected to said transducer and said datum pulse means for routing said datum pulse and succeeding transducer pulses to the further counter means, said further counter means causing commencement of said operation when the number of transducer pulses following each datum pulse is equal to the number loaded thereinto from the memory device, whereby the phase of commencement of said operations relative to the datum pulses is varied in accordance with the output of the memory as a function of the existing engine speed.

* * * * *